United States Patent
Yamauchi et al.

(10) Patent No.: US 9,557,666 B2
(45) Date of Patent: Jan. 31, 2017

(54) TONER

(71) Applicants: Yoshitaka Yamauchi, Shizuoka (JP); Chiaki Tanaka, Shizuoka (JP); Taichi Nemoto, Shizuoka (JP)

(72) Inventors: Yoshitaka Yamauchi, Shizuoka (JP); Chiaki Tanaka, Shizuoka (JP); Taichi Nemoto, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 225 days.

(21) Appl. No.: 14/328,053

(22) Filed: Jul. 10, 2014

(65) Prior Publication Data

US 2014/0342286 A1  Nov. 20, 2014

Related U.S. Application Data

(62) Division of application No. 13/282,792, filed on Oct. 27, 2011, now abandoned.

(30) Foreign Application Priority Data

Nov. 18, 2010  (JP) ................................. 2010-257476

(51) Int. Cl.
G03G 15/00 (2006.01)
G03G 9/08 (2006.01)
C08G 63/79 (2006.01)
C08G 63/81 (2006.01)
C08G 63/82 (2006.01)
G03G 9/087 (2006.01)

(52) U.S. Cl.
CPC ............. *G03G 9/0806* (2013.01); *C08G 63/79* (2013.01); *C08G 63/81* (2013.01); *C08G 63/823* (2013.01); *G03G 9/0808* (2013.01); *G03G 9/0812* (2013.01); *G03G 9/0815* (2013.01); *G03G 9/08795* (2013.01)

(58) Field of Classification Search
CPC .. G03G 9/0806; G03G 9/0815; G03G 9/0808; G03G 9/08795; G03G 63/79; G03G 63/823; G03G 63/81; G03G 9/0812
USPC ..................................... 430/137.15
See application file for complete search history.

(56) References Cited

U.S. PATENT DOCUMENTS

| | | | |
|---|---|---|---|
| 7,390,607 B2 | 6/2008 | Tanaka et al. | |
| 7,396,625 B2 | 7/2008 | Tanaka et al. | |
| 7,432,032 B2 | 10/2008 | Tanaka et al. | |
| 7,923,517 B2 | 4/2011 | Yoshida et al. | |
| 2007/0015077 A1 | 1/2007 | Yamashita et al. | |
| 2009/0162770 A1 | 6/2009 | Sako et al. | |
| 2010/0183967 A1 | 7/2010 | Sabu et al. | |
| 2011/0218301 A1 | 9/2011 | Nemoto et al. | |
| 2011/0218313 A1 | 9/2011 | Mase et al. | |

FOREIGN PATENT DOCUMENTS

| | | |
|---|---|---|
| JP | 4-179967 | 6/1992 |
| JP | 6-289644 | 10/1994 |

(Continued)

OTHER PUBLICATIONS

U.S. Appl. No. 13/805,962, filed Jan. 3, 2013 First Inventor: Nemoto, et al.

*Primary Examiner* — Thorl Chea

(74) *Attorney, Agent, or Firm* — Oblon, McClelland, Maier & Neustadt, L.L.P.

(57) ABSTRACT

A toner prepared by a method comprising granulating while polymerizing a ring-opening polymerizable monomer with a catalyst under the presence of a surfactant and a colorant in a compressible fluid.

10 Claims, 2 Drawing Sheets

(56) References Cited

FOREIGN PATENT DOCUMENTS

| | | |
|---|---|---|
| JP | 2003-79388 | 3/2003 |
| JP | 2006-91278 | 4/2006 |
| JP | 2006-285150 | 10/2006 |
| JP | 2008-163073 | 7/2008 |
| JP | 2008-262179 | 10/2008 |
| JP | 2009-132878 | 6/2009 |
| JP | 2009-149723 | 7/2009 |
| JP | 2009-151101 | 7/2009 |
| JP | 2009-167409 | 7/2009 |
| JP | 2010-77426 | 4/2010 |
| JP | 2010-122667 | 6/2010 |
| WO | WO 2009/142010 A1 | 11/2009 |

TONER

CROSS-REFERENCE TO RELATED APPLICATIONS

This patent application is a Divisional of U.S. application Ser. No. 13/282,792, filed Oct. 27, 2011, pending, and is based on and claims priority pursuant to 35 U.S.C. §119 to Japanese Patent Application No. 2010-257476, filed on Nov. 18, 2010, in the Japanese Patent Office, the entire disclosure of which is hereby incorporated herein by reference.

FIELD OF THE INVENTION

The present invention relates to a toner prepared by heterogeneously polymerizing a ring-opening polymerizable monomer in a compressible fluid.

BACKGROUND OF THE INVENTION

Methods of heterogeneously polymerizing a monomer in a supercritical carbon dioxide to prepare a particulate polymer, such as emulsion polymerization, dispersion polymerization and suspension polymerization are well known.

The heterogeneous polymerization in a supercritical carbon dioxide is used for preparing particulate polymers from various monomers because of having the following advantages compared with heterogeneous polymerizations in water or organic solvents:
(1) solvent removal and drying process after polymerization can be simplified;
(2) disposal of waste solvent is unnecessary;
(3) poisonous organic solvents need not be used;
(4) remaining unreacted monomer components and harmful materials can be removed by washing; and
(5) carbon dioxide used can be collected and reused.

The particulate polymers are used for various applications such as developers for electrophotography, inks for printings, coatings for constructions and cosmetics.

Japanese published unexamined application No. 2009-167409 discloses a method of synthesizing a colored particulate polymer from a radical polymerizable monomer under the presence of a surfactant including a perfluoroalkyl group. However, a fluorochemical surfactant used in this method is very expensive and has a problem in terms of safety. Further, particulate polymers having small molecular weight distributions (Mw/Mn=about 2 or less) cannot be obtained.

Japanese published unexamined application No. 2009-132878 discloses a method of obtaining a particulate polymer and synthesizing a polymeric surfactant in one pot at the same time using a polymeric radical polymerization initiator having an organosiloxane skeleton without separately preparing a surfactant in accordance with a monomer. However, particulate polymers having a molecular weight distribution (Mw/Mn) of 2 or less cannot be obtained, either. This does not disclose a ring-opening polymerizable monomer.

Therefore, a method of preparing a particulate polymer having a small molecular weight distribution using a ring-opening polymerizable monomer in a compressible fluid is unknown.

As a binder resin for use in a toner, thermoplastic resins from petroleum such as styrene acrylic resins and polyester resins are used. However, in recent years, in consideration of the environment, methods of using biodegradable resins having less effect thereon when wasted and formed of recyclable resources from biomass as a toner binder resin have commanded attention, and a variety of the methods are disclosed.

As one of the methods, Japanese published unexamined applications Nos. 04-179967 and 2008-262179 disclose a method of using a biodegradable microbial production aliphatic polyester as a binder resin. However, when the polyester is used as a resin for a toner, the toner has a high softening point and a high fixable temperature, and therefore this is unsuitable in terms of saving energy. As a method of lowering the fixable temperature, Japanese Patent No. 2597452 discloses a method of adding a large amount of a plant wax to the biodegradable resin to lower the softening point. The softening point of a toner can be lowered, but the wax agglutinates the toner and productivity of the toner deteriorates, and fluidity thereof also deteriorates, resulting in deterioration of feedability thereof in an image developer.

To obtain low-temperature fixability and fixing stability, Japanese published unexamined applications Nos. 2006-091278 and 2006-285150 disclose a method of using a binder resin including two resins having softening points different from each other and a biodegradable resin. In this method, the resin having a lower softening point plays a part of joining the resin having a higher softening point with the biodegradable resin, and the biodegradable resin is uniformly dispersed in a binder resin. However, when the content of the biodegradable resin is high, it is not well dispersed, resulting in deterioration of developability due to uneven chargeability and deterioration of durability. Therefore, the binder resin includes the biodegradable resin in a very small amount of 20% by weight.

Further, this is not particularly specified, but the biodegradable resin deteriorates a glass transition temperature and a heat distortion temperature because of absorbing moisture. Therefore, it has a defect of agglutination of particles or images when transported or stored in hot and humid conditions, which is unusable.

As mentioned above, the biodegradable resin has too many problems to be a main component of a binder resin of a toner, and needs further improvement in synthesizing and properties to have both heat and humidity resistance, and low-temperature fixability.

Because of these reasons, a need exists for a toner having a small molecular weight distribution, a low-temperature fixability, heat and humidity resistance, and environmental stability.

SUMMARY OF THE INVENTION

Accordingly, an object of the present invention is to provide a toner having a small molecular weight distribution, a low-temperature fixability, heat and humidity resistance, and environmental stability.

Another object of the present invention is to provide a toner having the same properties even when including a biodegradable resin as a main component in its binder resin.

These objects and other objects of the present invention, either individually or collectively, have been satisfied by the discovery of a toner prepared by granulating while polymerizing a ring-opening polymerizable monomer with a catalyst under the presence of a surfactant and a colorant in a compressible fluid.

These and other objects, features and advantages of the present invention will become apparent upon consideration of the following description of the preferred embodiments of the present invention taken in conjunction with the accompanying drawings.

DETAILED DESCRIPTION OF THE INVENTION

The present invention provides a toner having a small molecular weight distribution, a low-temperature fixability, heat and humidity resistance, and environmental stability.

More particularly, the present invention relates to a toner prepared by granulating while polymerizing a ring-opening polymerizable monomer with a catalyst under the presence of a surfactant and a colorant in a compressible fluid.

The present invention polymerizes the ring-opening polymerizable monomer and granulates the resultant polymer at the same time in the compressible fluid. This is the first time to granulate the polymer in the compressible fluid using the ring-opening polymerizable monomer.
(Compressible Fluid)

Figure 1:
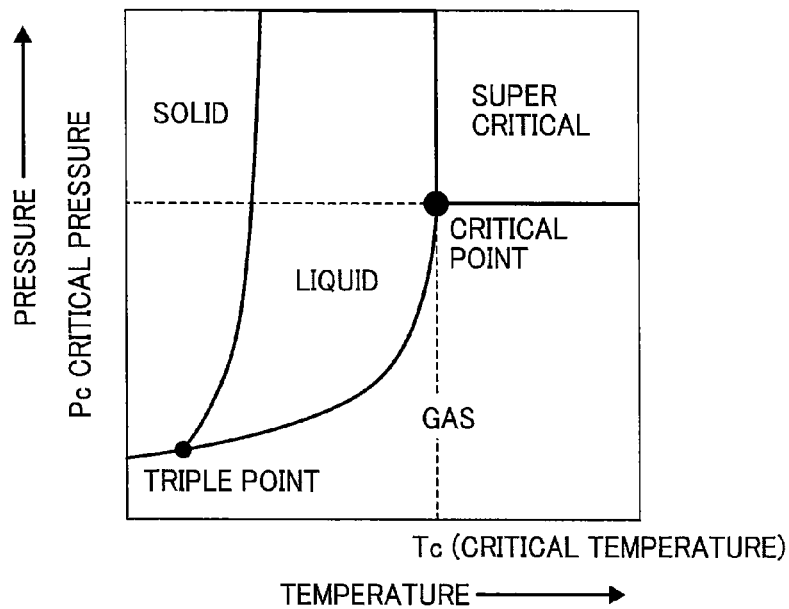
FIG. 1 is a phase diagram for explaining the compressible fluid in the present invention.
Figure 2:
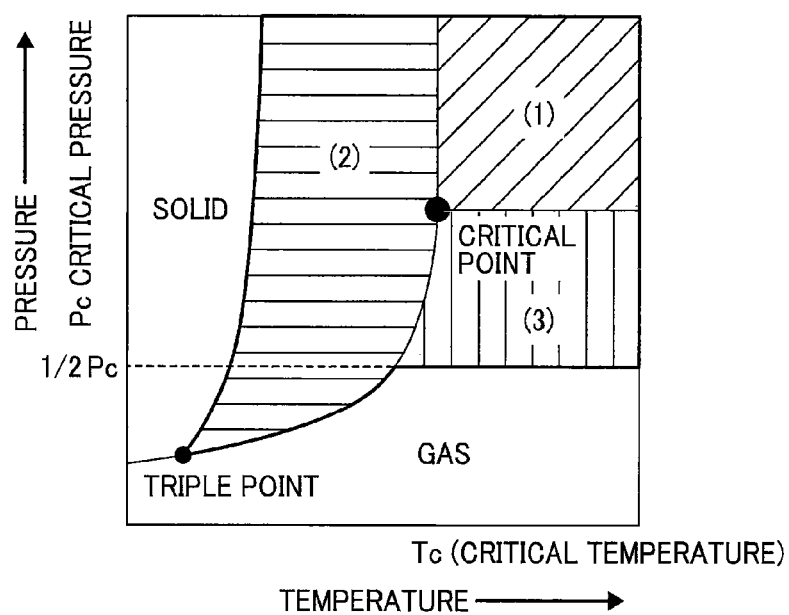
FIG. 2 a diagram for explaining regions according to kinds of the compressible fluid.

The compressible fluid in the present invention means a status of a material present in any one of regions (1), (2) and (3) in FIG. 2 in the phase diagram in FIG. 1.

In the regions, the material has a very high density and in known to show a behavior different from that at normal temperature and normal pressure. When the material is present in the region (1), it is s supercritical fluid. The supercritical fluid is present as a noncondensable high-density fluid at a temperature and a pressure over a limit (critical point) to which a gas and a liquid can coexist, does not condense even when compressed, and in a state of supercritical temperature or more and a supercritical pressure or more. When the material is present in the region (2), it is a liquid. In the present invention, it is a liquidated gas obtained by compressing a material which is a gas at normal temperature (25° C.) and normal pressure (1 atmosphere). When the material is present in the region (3), it is a gas. In the present invention, it is a high-pressure gas having a pressure not less than ½ Pc.

Specific examples of the materials usable in a compressible fluid include carbon monoxide, carbon dioxide, dinitrogen monoxide, nitrogen, methane, ethane, propane, 2,3-dimethylbutane, ethylene, etc. These can be used alone or in combination. Particularly, the carbon dioxide having a critical pressure about 7.4 MPa and a critical temperature about 31° C. is preferably used because it is easy to become supercritical, and inflammable and easy to handle. In consideration of reaction efficiency, the reaction temperature is preferably not less than 25° when the compressible fluid is a carbon dioxide. It is preferable that the higher the pressure, the higher the solubility of the surfactant
(Ring-Opening Polymerizable Monomer)

The ring-opening polymerizable monomer in the present invention is not particularly limited as long as it has a ester bond in its ring, and includes cyclic esters, cyclic carbonates, etc.

Known cyclic esters can be used, and cyclic dimmers obtained by dehydration condensing an L body or a D body of a compound having the following formula (A) are preferably used:

wherein R represents an alkyl group having 1 to 10 carbon atoms.

Specific examples of compounds having the formula (A) include enantiomers of lactic acid, 2-hydroxybutanoic acid, 2-hydroxypentanoic acid, 2-hydroxyhexanoic acid, 2-hydroxyheptanoic acid, 2-hydroxyoctanoic acid, 2-hydroxynonane acid, 2-hydroxydecanoic acid, 2-hydroxyundecanoic acid, 2-hydroxydodecanoic acid, etc. Among these, the enantiomers of lactic acid are preferably used in terms of reactivity and obtainability. These cyclic dimmers can be used alone or in combination.

Specific examples of cyclic esters besides the compounds having the formula (A) include aliphatic lactones such as β-propiolactone, β-butyrolactone, γ-butyrolactone, γ-hexanolactone, γ-octanolactone, δ-valerolactone, δ-hexanolactone, δ-octanolactone, ε-caprolactone, β-dodecanolactone, α-methyl-γ-butyrolactone, β-methyl-δ-valerolactone, glycolide and lactide. Particularly, the ε-caprolactone is preferably used in terms of reactivity and obtainability.

Specific examples of the cyclic carbonates include, but are not limited to, ethylene carbonate and propylene carbonate.

The ring-opening polymerizable monomer can be used alone or in combination. The resultant polymer preferably has a glass transition temperature not less than room temperature. When too low, the polymer cannot occasionally be obtained as a particulate material.
(Catalyst)

Both of metallic catalysts and organic catalysts not including a metallic atom can be used to polymerize the ring-opening polymerizable monomer, but the organic catalysts are preferably used in consideration of influence upon environment. The organic catalyst helps the ring-opening polymerizable monomer with the ring-opening reaction, forms an active intermediate with the ring-opening polymerizable monomer, releases with by a reaction with alcohol, and recovers. Cationic catalysts can also be used, but they draw out a hydrogen atom from a main chain of the polymer (back-biting), and the polymer has a wide molecular weight distribution and is difficult to have high molecular weight. Therefore, a nitrogen compound working as a nucleophile having basicity is preferably used, and a cyclic compound including a nitrogen atom is more preferably used. Specific examples the cyclic compound include, cyclic amines such as quinuclidine; cyclic diamines such as 1,4-diazabicyclo[2.2.2]octane (DABCO) and 1,5-diazabicyclo(4,3,0) nonane-5; cyclic diamine compounds having an amidine skeleton such as 1,8-diazabicyclo[5.4.0]undeca-7-ene (DBU)), diazabicyclononen; cyclic triamine compounds having a guanidine skeleton such as 1,5,7-triazabicyclo[4.4.0]deca-5-ene (TBD) and diphenylguanidine (DPG); heterocyclic aromatic organic compounds including a nitrogen atom such as N,N-dimethyl-4-aminopyridine (DMAP), 4-pyrrolidinopyridine (PPY), pyrrocoline, imidazole, pryimidine and purine; and N-heterocyclic carbene such as 1,3-di-tert-butylimidazole-2-ylidene (ITBU), etc. Among these, DABCO, DBU, DPG, TBD, DMAP, PPY and ITBU are preferably used.

Specific examples of the metallic catalysts include derivatives of zinc, lead, bismuth, zirconium, germanium, etc. Specific examples of the derivatives include metallic organic compounds, carbonates, oxides, halides, etc.

The organic catalyst and an amount used thereof depend on combinations of the compressible fluid and the ring-opening polymerizable monomer and are not necessarily specified, but the organic catalyst is preferably used in an amount of 0.01 to 15 mol %, more preferably from 0.1 to 1 mol %, and furthermore preferably from 0.3 to 0.5 mol % per 100 mol % of the ring-opening polymerizable monomer. When less than 0.01 mol %, the organic catalyst is deactivated before the polymerization is completed and a polymer having a desired molecular weight is unobtainable. When greater than 15 mol %, the polymerization is difficult to control.

The polymerization temperature is not necessarily specified because of depending on combinations of the compressible fluid, the ring-opening polymerizable monomer and the organic catalyst, but is ordinarily from 40 to 150° C., preferably from 50 to 120° C., and more preferably from 60 to 100° C. The reaction speed is likely to decrease when less than 40° C. and the polymerization is not quantitatively performed. When greater than 150° C., depolymerization is parallely performed, and the polymerization is difficult to be quantitatively performed, either.

The polymerization time may be properly determined according to a desired molecular weight. Ordinarily 2 to 12 hrs to produce molecular weight of from 3,000 to 100,000. 5 to 72 hrs are needed to increase polymerization ratio, but the polymerization speed can be increased by stopping polymerization when the polymer has a desired particle diameter or a particle diameter distribution, adding a polymerization initiator, or polymerizing under high pressure.

In order to uniformly and quantitatively perform the polymerization, a difference of density between the monomer and the particulate polymer may be compensated by stirring such that the he particulate polymer does not settle down.

A pressure when polymerizing, i.e., the compressible fluid, which may be a liquidated gas or a high-pressure gas, preferably has a pressure to become supercritical to increase solubility of the monomer in the compressible fluid and o uniformly and quantitatively perform the polymerization. When the compressible fluid is carbon dioxide, it preferably has a pressure not less than 3.7 Mpa, and more preferably not less than 7.4 Mpa.

(Polymerization Initiator)

A ring-opening polymerization initiator is preferably added to control a molecular weight of the resultant polymer in polymerization.

Known ring-opening polymerization initiators can be used, and alcohols, e.g., any mono, di-, poly-, saturated and unsaturated aliphatic alcohols can be used.

Specific examples of the alcohols include monoalcohols such as methanol, ethanol, propanol, isopropanol, butanol, pentanol, hexanol, heptanol, nonanol, decanol, lauryl alcohol, myristyl alcohol, cetyl alcohol and stearyl alcohol; diols such as ethylene glycol, 1,2-propanediol (propylene glycol), 1,3-propanediol, 1,4-butanediol (tetramethylene glycol), 2,3-butanediol, diethylene glycol, triethylene glycol, 1,5-pentadiol, neopentyl glycol, hexane diol, 1,6-hexanediol, 2-ethyl-1,3-hexanediol, nonane diol, polyethylene glycol, hydrogenated bisphenol A and adducts of bisphenol A with cyclic ethers such as ethylene oxide and propylene oxide; polyols such as glycerol, sorbitol, xylitol, ribitol, erythritol and triethanolamine; and methyl lactate, ethyl lactate, etc. Diblock and triblock copolymers including a polymer having an alcohol residue at the end can also be used.

The content of the ring-opening polymerization initiator may be adjusted according to a desired molecular weight, and is preferably from 0.1 to 5 parts by weight per 100 parts by weight of the ring-opening polymerizable monomer.

Polymerization terminators such as benzoic acid, hydrochloric acid, phosphoric acid, metaphosphoric acid, acetic acid and lactic acid can be used when necessary after polymerization.

(Surfactant)

In the present invention, a surfactant soluble in the compressible fluid and having affinity with the compressible fluid and the ring-opening polymerizable monomer coexist therewith. For example, when supercritical carbon dioxide is used as the compressible fluid, a surfactant including a parent $CO_2$ group and a parent monomer group in its molecule is used. Specific examples of the parent $CO_2$ group include perfluoroalkyl groups, polydimethylsiloxane groups, polyacrylate groups, ether groups, carbonyl groups, etc. The parent monomer can be selected according to kinds of the monomer used. For example, lactide or lactone is used as the monomer, a surfactant having a carbonyl group such as ester bonds and amide bonds is preferably used.

The surfactant may be added either to the compressible fluid or the ring-opening polymerizable monomer.

Specific examples of the surfactant include those having any one of the following formulae (1) to (7) as a part:

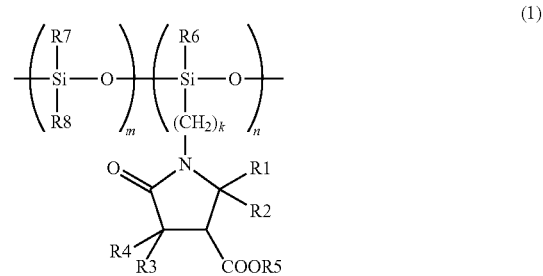

(1)

wherein each of R1 to R5 represents a hydrogen atom or a lower alkyl group having 1 to 4 carbon atoms; each of R6 to R8 represents a lower alkyl group having 1 to 4 carbon atoms; and each of m, n, and k is an integer representing a repeat unit, a relationship of m/n=0.3 to 70 is satisfied, and k is from 1 to 4.

The resultant surfactant has a molecular weight not greater than 7,000.

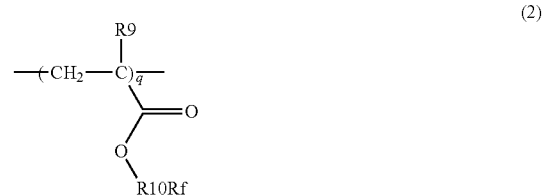

(2)

wherein R9 represents a hydrogen atom or a methyl group; R10 represents a methylene group or an ethylene group; Rf represents a perfluoroalkyl group having 7 to 10 carbon atoms; and q is an integer representing a repeat unit.

The resultant surfactant has a molecular weight not greater than 2,500.

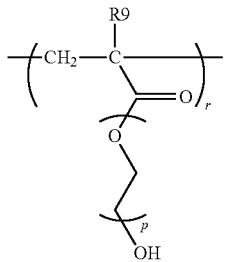
(3)

wherein R9 represents a hydrogen atom or a methyl group; and each of r and p is an integer representing a repeat unit.

The resultant surfactant has a molecular weight not greater than 5,500.

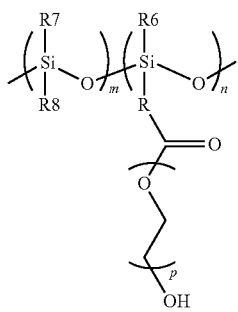
(4)

wherein each of R and R6 to R8 represents a lower alkyl group having 1 to 4 carbon atoms; and each of m, n, and p is an integer representing a repeat unit, a relationship of m/n=0.3 to 70 is satisfied.

The resultant surfactant has a molecular weight not greater than 5,000.

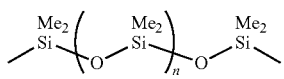
(5)

wherein n is an integer representing a repeat unit.

The resultant surfactant has a molecular weight not greater than 5,000.

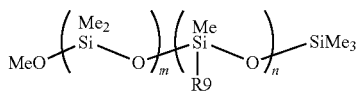
(6)

wherein R9 represents a lower alkyl group having 1 to 4 carbon atoms; and each of m and n is an integer representing a repeat unit, a relationship of m/n=0.3 to 70 is satisfied.

The resultant surfactant has a molecular weight not greater than 5,000.

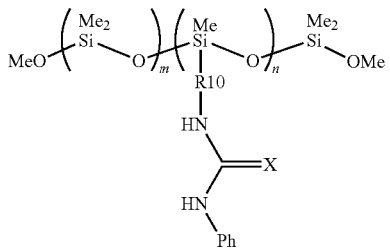
(7)

wherein R10 represents a lower alkyl group having 1 to 4 carbon atoms; X represents an oxygen atom or a sulfur atom; and each of m and n is an integer representing a repeat unit, a relationship of m/n=0.3 to 70 is satisfied.

The resultant surfactant has a molecular weight not greater than 5,000.

Particularly, the surfactant having the formula (1) is preferably used. Each of R6 to R8 is preferably a methyl group, and k is preferably 2. When k is too small, a pyrrolidone skeleton and a silicone skeleton dimensionally close to each other, resulting in functional deterioration of the surfactant. When k is too large, the solubility in the compressible fluid possibly decreases.

Among the surfactants having the formula (1), the following surfactant 1 is preferably used. This is marketed in the commercial name of MONACIL PCA from Croda Japan KK.

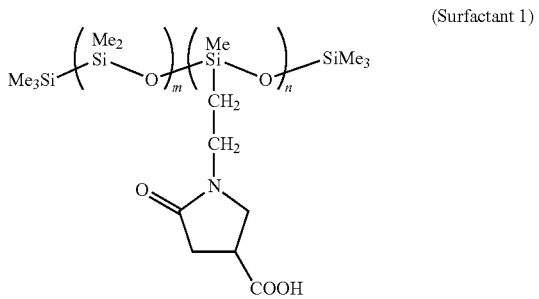
(Surfactant 1)

As the surfactant for use in the present invention, those soluble in the compressible fluid and having affinity with the compressible fluid and the ring-opening polymerizable monomer can be used besides those having the formulae (1) to (7). Specific examples thereof includes those having the following formulae (8) to (11):

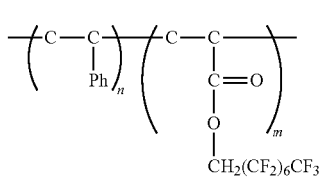
(8)

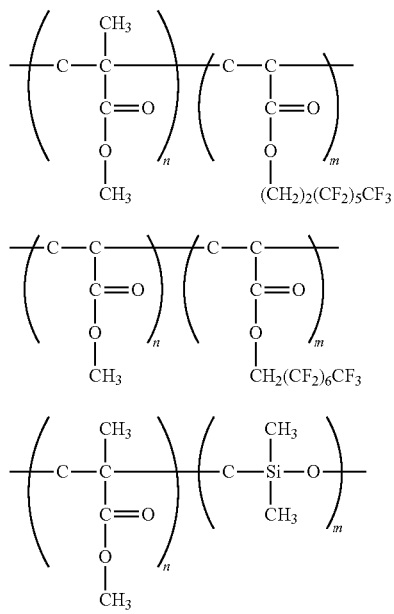

wherein each of in and n is an integer representing a repeat unit.

The surfactant is properly selected according to kinds of the compressible fluid used, or whether a particulate polymer and a particulate seed (mentioned later) or grown particles is prepared. Particularly to dimensionally prevent particulate polymers from uniting with each other, the surfactant preferably has high affinity and sorbability with the surface of the particulate polymer, and high affinity and solubility with the compressible fluid.

In order to dimensionally increase repulsion between the particles, the surfactant preferably has a sufficiently-long molecular chain and a molecular weight not less than 10,000. However, when the molecular weight is too large, the liquid viscosity increases too much, the operability and stirrability deteriorate, resulting in uneven precipitaion of the resultant polymer on the surface of a particle.

The content of the surfactant depends on kinds of the ring-opening polymerizable monomer and the surfactant, but is preferably from 0.1 to 10% by weight, and more preferably from 1 to 5% by weight based on total weight of the compressible fluid. When the surfactant has a low concentration, the resultant particulate polymer has relatively a large particle diameter. When the concentration is high, the particle diameter is small. However, even when the content is greater than 10% by weight, the particle diameter does not become small effectively.

Particles produced at the beginning of polymerization are stabilized by a surfactant present between the compressible fluid and the surface of the particulate polymer while keeping balance. When the ring-opening polymerizable monomer is present considerably much in the compressible fluid, the particulate monomer has a high concentration and agglutinates over the dimensional repulsion of the surfactant. When too much, the resultant polymer is completely dissolved and does not precipitate until the polymerization is performed to some extent. In this case, a block object having high adherence is formed.

Therefore, an amount of the ring-opening polymerizable monomer to the compressible fluid when the particulate polymer is prepared is automatically limited, and preferably not greater than 500% by weight, and more preferably not greater than 250% by weight although having different density depending on the compressible fluid.

—Polymerization Method—

In a compressible fluid, under the presence of a surfactant and a colorant, a ring-opening polymerizable monomer is granulated while polymerized with a catalyst to prepare a particulate polymer (toner) having an average particle diameter of from sub-micron to 1 mm. The particle diameter can be controlled by a pressure in the reaction, a temperature, a reaction time, an amount of the surfactant, etc., and the reaction conditions are optionally changed to prepare various particulate polymers having the shape of from a sphere to an infinite form.

The polymerization methods include dispersion, suspension polymerization and emulsion polymerization, which can be used for different purposes. Particularly, the dispersion polymerization id better than the suspension polymerization or the emulsion polymerization in terms of taking an advantage of using the compressible fluid, and mono-dispersibility and a narrow particle diameter distribution of the particulate polymer.

A particulate polymer (particulate seed) having a particle diameter smaller than desired and a narrow particle diameter distribution may previously be added to grow monomers.

Monomers used for growing may be the same monomers preparing the particulate seed or other monomers, but the resultant polymer should not be dissolved in the compressible fluid.

The thus prepared compressible fluid in which a polymer is dispersed is returned into an environment of normal temperature and normal pressure to prepare a dried particulate polymer.

For example, after a surfactant is completely dissolved in a compressible fluid, one or more ring-opening polymerizable monomer and a polymerization initiator are added thereto, and the solution is heated to have a temperature in accordance with a decomposition rate of the polymerization initiator while stirred at a speed uniforming a flow in a reaction tank. The heating temperature is preferably from 40 to 100° C., and more preferably from 50 to 85° C.

An initial temperature of the polymerization largely affects a particle diameter of the resultant particulate polymer, and therefore it is preferable that the temperature is increased to a polymerization temperature after the ring-opening polymerizable monomer is added and the initiator dissolved in a small amount of the compressible fluid is added.

In polymerization, a moisture included in the air in the reaction container fully needs expelling n inactive gas such as nitrogen gas, argon gas and carbon dioxide gas. When a moisture is not fully removed, particle diameters cannot be uniformed and fine particles are likely to be produced.

(Colorant)

The colorant for use in the present invention is not particularly limited, and can be selected from known pigments in accordance with the purposes.

Specific examples of yellow pigment include cadmium yellow, mineral fast yellow, nickel titanium yellow, Naples yellow, naphthol yellow S, Hansa yellow G, Hansa yellow 10G, benzidine yellow GR, quinoline yellow lake, permanent yellow NCG and tartrazine lake.

Specific examples of orange pigment include molybdenum orange, permanent orange GTR, pyrazolone orange, Vulcan orange, indanthrene brilliant orange RK, benzidine orange G and indanthrene brilliant orange GK.

Specific examples of red pigment include iron red, cadmium red, permanent red 4R, lithol red, pyrazolone red, watching red calcium salt, lake red D, brilliant carmine 6B, eosin lake, rhodamine lake B, alizarin lake and brilliant carmine 3B.

Specific examples of violet pigment include fast violet B and methyl violet lake.

Specific examples of blue pigment include cobalt blue, alkali blue, Victoria blue lake, phthalocyanine blue, nonmetal phthalocyanine blue, phthalocyanine blue-partly chloride, fast sky blue and indanthrene blue BC.

Specific examples of green pigment include chromium green, chromium oxide, pigment green B and malachite green lake.

Specific examples of black pigment include carbon black, oil furnace black, channel black, lamp black, acetylene black, an azine color such as aniline black, metal salt azo color, metal oxide and complex metal oxide.

These can be used alone or in combination.

Particularly, pigment yellow such as PY93, PY128, PY155, PY180 and PY74; pigment blue such as PB15:3; pigment red such as PR122, PR269, PR184, PR57:1, PR238, PR146 and PR185; and carbon black are preferably used.

The colorant may be used as a masterbatch pigment combined with a resin. Specific examples of the resin include, but are not limited to, styrene polymers or substituted styrene polymers, styrene copolymers, a polymethyl methacrylate resin, a polybutylmethacrylate resin, a polyvinyl chloride resin, a polyvinyl acetate resin, a polyethylene resin, a polypropylene resin, a polyester resin, an epoxy resin, an epoxy polyol resin, a polyurethane resin, a polyamide resin, a polyvinyl butyral resin, an acrylic resin, rosin, modified rosins, a terpene resin, an aliphatic or an alicyclic hydrocarbon resin, an aromatic petroleum resin, chlorinated paraffin, paraffin waxes, etc. These can be used alone or in combination.

The masterbatch for use in the toner of the present invention is typically prepared by mixing and kneading a resin and a colorant upon application of high shear stress thereto. In this case, an organic solvent can be used to heighten the interaction of the colorant with the resin. In addition, flushing methods in which an aqueous paste including a colorant is mixed with a resin solution of an organic solvent to transfer the colorant to the resin solution and then the aqueous liquid and organic solvent are separated and removed can be preferably used because the resultant wet cake of the colorant can be used as it is. Of course, a dry powder which is prepared by drying the wet cake can also be used as a colorant. In this case, a three-roll mill is preferably used for kneading the mixture upon application of high shear stress.

The colored particulate polymer preferably includes the colorant in an amount of from 01 to 20% by weight, more preferably from 1 to 15% by weight, and furthermore preferably from 3 to 10% by weight. When less than 0.1% by weight, toner deteriorates in colorability. When greater than 20% by weight, the colorant is not dispersed well in a toner, resulting in deterioration of colorability and electrical properties of the toner.

—Preparation Method of Pigment Dispersion—

A mixture of at least the ring-opening polymerizable monomer and the pigment is pulverized and uniformly mixed or dissolved in a side grinder, a paint shaker, a ball milling apparatus, a sand mill apparatus, etc. under the presence of media such as glass beads, zirconia beads, alumina beads and iron balls. The ring-opening polymerizable monomer composition the media are removed from is further placed in a high-pressure cell including a supercritical or a subcritical fluid. This is dispersed and mixed by a stirrer with a full shearing force to prepare a pigment dispersion including the pigment, the ring-opening polymerizable monomer and the supercritical or subcritical fluid for use in the present invention.

Besides, methods of mixing and dispersing the ring-opening polymerizable monomer with the supercritical or subcritical fluid include a method of introducing the supercritical or subcritical fluid into the ring-opening polymerizable monomer, a method of introducing a liquid into the ring-opening polymerizable monomer and heating the liquid to be supercritical, etc. It is also possible that the pigment is dispersed in the supercritical or subcritical fluid and the ring-opening polymerizable monomer is added thereto.

The content of the pigment is preferably 0.1 to 50 parts by weight, more preferably from 0.5 to 30 parts by weight, and furthermore preferably from 1 to 20 parts by weight per 100 parts by weight of the ring-opening polymerizable monomer. When less than 0.1 parts by weight, the colorability deteriorates. When greater than 50 parts by weight, the pigment agglutinates or settles down, or the resultant mixture increases in viscosity.

In the present invention, a pigment dispersant may be used together. Known dispersants can be used.

Specific examples of the pigment dispersant include, but are not limited to basic polymeric copolymer dispersants such as AJISPER PB711, AJISPER PB821 and AJISPER PB822 from Ajinomoto Fine-Techno Co., Inc.; modified polyurethane dispersants such as EFKA-4060, EFKA-4080, EFKA-7462, EFKA-4015, EFKA-4046, EFKA-4047, EFKA-4055 and EFKA-4050 from EFKA CHEMICALS, B.V.; acidic polymeric copolymer dispersants, polyester dispersants, acrylic acids, methacrylic acids, their ester polymers, colorant derivatives such as SOLSPERSE 22000 from Lubrizol Advanced Materials, Inc, etc.

The content of the pigment dispersant depends on a pigment surface area, but is preferably from 1 to 30% by weight based on total weight of the pigment.

The toner of the present invention may further include a release agent, an inorganic particulate material, a charge controlling agent, a fluidity improver, a cleanability improver in accordance with the purposes.

(Release Agent)

The release agent is not particularly limited, and can be selected from known release agents in accordance with the purpose. Suitable materials for use as the release agent include waxes and silicone oils.

Specific examples of the waxes include low-molecular-weight polyolefin waxes, synthetic hydrocarbon waxes, natural waxes, petroleum waxes, higher fatty acids and their derivatives, higher fatty acid amide, and modified versions of these waxes, etc. These waxes can be used alone or in combination.

Specific examples of the low-molecular-weight polyolefin waxes include low molecular weight polyethylene and low-molecular-weight polypropylene, etc.

Specific examples of the synthetic hydrocarbon waxes include Fischer-Tropsch waxes, etc.

Specific examples of the natural waxes include bees waxes, carnauba waxes, candelilla waxes, rice waxes, montan waxes, etc.

Specific examples of the petroleum waxes include paraffin waxes, microcrystalline waxes, etc.

Specific examples of the higher fatty acids include stearic acid, palmitic acid, myristic acid, etc.

Specific examples of the silicone oils include dimethyl silicone oil, methylphenyl silicone oil, methylhydrogen silicone oil, polyether modified silicone oil, epoxy modified silicone oil, amino modified silicone oil, carboxyl modified silicone oil, mercapto modified silicone oil, carbinol modified silicone oil, methacryl modified silicone oil, alkyl modified silicone oil, phenol modified silicone oil, fatty acid ester modified silicone oil, vinyl modified silicone oil, alkoxy modified silicone oil, heterogeneous functional group modified silicone oils, etc. These can be used alone or in combination.

A melting points of the release agent is not particularly limited, and can be selected in accordance with the purpose. However, the release agent preferably has a melting point of from 40 to 160° C., more preferably from 50 to 120° C., and furthermore preferably from 60 to 90° C.

When the melting point is lower than 40° C., the release agent has an adverse effect on the blocking resistance of the resultant toner. When higher than 160° C., the resultant toner causes a cold offset problem and a paper is wound around the fixing roller.

The content of the release agent in a toner is not particularly limited, and can be selected in accordance with the purpose. However, the toner preferably includes the release agent in an amount of from 0 to 40 parts by weight, and more preferably from 3 to 30 parts by weight.

When greater than 40 parts by weight, the resultant toner has poor low-temperature fixability and produces poor quality images (glossiness is too high).

In the present invention, the pigment dispersion may include the release agent in an amount of from 0 to 20 parts by weight, more preferably from 0 to 15 parts by weight, and furthermore preferably from 0 to 10 parts by weight per 100 parts by weight of the ring-opening polymerizable monomer. The pigment dispersion including the release agent can prepare a colored particulate polymer including the release agent. In the dispersion polymerization in a supercritical fluid, mechanism including the release agent is not clarified, but the following two mechanisms can be thought.

One is that the release agent is dissolved by plastic effect with heat in the supercritical fluid and taken in with the dispersion polymerization, and the other is that the release agent dissolved in the supercritical fluid is partly taken (injected) into a particulate polymer according to partition coefficient. The colored particulate polymer includes the release agent because a lamellar is observed therein through a TEM picture thereof.

The release agent may be mixed with the pigment and the ring-opening polymerizable monomer and dispersed therein to be included in the ring-opening polymerizable monomer. However, in order to finely disperse the release agent, it is preferable that a release agent dispersion is prepared with the release agent and the ring-opening polymerizable monomer, and the release agent dispersion is mixed with the pigment and the ring-opening polymerizable monomer.

The inorganic particulate material is not particularly limited, and can be selected from known inorganic particulate materials in accordance with the purpose. Specific examples thereof include silica, alumina, titanium oxide, barium titanate, magnesium titanate, calcium titanate, strontium titanate, zinc oxide, tin oxide, quartz sand, clay, mica, sand-lime, diatom earth, chromium oxide, cerium oxide, red iron oxide, antimony trioxide, magnesium oxide, zirconium oxide, barium sulfate, barium carbonate, calcium carbonate, silicon carbide, and silicon nitride. These are used alone or in combination.

The inorganic particulate material preferably has a primary particle diameter of from 5 nm to 2 µm, and more preferably from 5 nm to 500 nm. Further, the inorganic particulate material preferably has a specific surface area of from 20 to 500 $m^2/g$ when measured by BET method.

The toner preferably includes the inorganic particulate material of from 0.01 to 5.0% by weight, and more preferably from 0.01 to 2.0% by weight.

The charge controlling agent is not particularly limited, and can be selected from known charge controlling agents in accordance with the purpose. However, colorless or white charge controlling agents are preferably used because colored charge controlling agents change the color tone of a toner. Specific examples thereof include Nigrosine dyes, triphenyl methane dyes, chromium-containing metal complex dyes, molybdic acid chelate pigments, Rhodamine dyes, alkoxyamines, quaternary ammonium salts, fluorine-modified quaternary ammonium salts, alkylamides, phosphor and its compounds, tungsten and its compounds, fluorine-containing activators, metal salts of salicylic acid, metal salts of salicylic acid derivatives, etc. Specific examples of the metal for use in the metal salts mentioned above include aluminum, zinc, titanium, strontium, boron, silicon, nickel, iron, chromium, zirconium, etc.

Specific examples of the marketed charge controlling agents include BONTRON P-51 (quaternary ammonium salt), BONTRON E-82 (metal complex of oxynaphthoic acid), BONTRON E-84 (metal complex of salicylic acid), and BONTRON E-89 (phenolic condensation product), which are manufactured by Orient Chemical Industries Co., Ltd.; TP-302 and TP-415 (molybdenum complex of quaternary ammonium salt), which are manufactured by Hodogaya Chemical Co., Ltd.; COPY CHARGE PSY VP2038 (quaternary ammonium salt), COPY BLUE (triphenyl methane derivative), COPY CHARGE NEG VP2036 and COPY CHARGE NX VP434 (quaternary ammonium salt), which are manufactured by Hoechst AG; LRA-901, and LR-147 (boron complex), which are manufactured by Japan Carlit Co., Ltd.; quinacridone, azo pigments, and polymers having a functional group such as a sulfonate group, a carboxyl group, a quaternary ammonium group, etc.

The charge controlling agent may be dissolved or dispersed after melted and kneaded with the masterbatch.

The content of the charge controlling agent in the toner of the present invention is determined depending on the variables such as choice of binder resin, presence of additives, and dispersion method. In general, the content of the charge controlling agent is preferably from 0.1 to 10 parts by weight, and more preferably from 1 to 5 parts by weight, per 100 parts by weight of the binder resin included in the toner. When the content is too low, a good charge property cannot be imparted to the toner. When the content is too high, the charge quantity of the toner excessively increases, and thereby the electrostatic attraction between the developing roller and the toner increases, resulting in deterioration of fluidity and decrease of image density.

(Fluidity Improver)

The fluidity improver is a surface treatment agent to increase the hydrophobicity of a toner to prevent deterioration of fluidity and chargeability thereof even in an environment of high humidity. Specific examples thereof include a silane coupling agent, a sililating agent, a silane coupling agent having an alkyl fluoride group, an organic titanate coupling agent, an aluminium coupling agent a silicone oil and a modified silicone oil.

(Cleanability Improver)

The cleanability improver is added to remove a developer remaining on a photoreceptor and a first transfer medium after transferred. Specific examples of the cleanability improver include fatty acid metallic salts such as zinc stearate, calcium stearate and stearic acid; and polymer particles prepared by a soap-free emulsifying polymerization method such as polymethylmethacrylate particles and polystyrene particles. The polymer particles comparatively have a narrow particle diameter distribution and preferably have a volume-average particle diameter of from 0.01 to 1 μm.

The shape and size of the toner of the present invention are not particularly limited, and can be selected according to the purpose. However, the toner preferably has the following thermal properties, image density, average circularity, volume-average particle diameter, and ratio of the volume-average particle diameter to the number-average particle diameter (volume-average particle diameter/the number-average particle diameter).

Toner heat properties are, in other words, flow tester properties, and include a softening point (Ts), a flow starting temperature (Tfb), a ½ softening point (T½), etc.

The heat properties can be measured by a method optionally selected, such as a flow curve using an elevated flow tester CFT500 from Shimadzu Corporation. The softening point is preferably not less than 50° C., and more preferably from 80 to 120° C. When less than 50° C., the resultant toner occasionally has poor heat resistant preservability or offset resistance The flow starting temperature (Tfb) is preferably not less than 60° C., and more preferably from 70 to 150° C. When less than 60° C., the resultant toner occasionally has poor heat resistant preservability or offset resistance.

The ½ softening point (T½) is preferably not less than 60° C., and more preferably from 80 to 170° C. When less than 60° C., the resultant toner occasionally has poor heat resistant preservability or offset resistance.

The developer of the present invention includes at least the toner of the present invention, and optionally other components such as a carrier. The developer may be a one-component developer or a two-component developer, however, the two-component developer having a long life is preferably used in high-speed printers in compliance with the recent high information processing speed.

The carrier is not particularly limited, and can be selected in accordance with the purpose, however, preferably includes a core material and a resin layer coating the core material.

The core material is not particularly limited, and can be selected from known materials such as Mn—Sr materials and Mn—Mg materials having 50 to 90 emu/g; and highly magnetized materials such as iron powders having not less than 100 emu/g and magnetite having 75 to 120 emu/g for image density. In addition, light magnetized materials such as Cu—Zn materials having 30 to 80 emu/g are preferably used to decrease a stress to a photoreceptor having toner ears for high-quality images. These can be used alone or in combination.

The core material preferably has a weight-average particle diameter (D50) of from 10 to 200 μm, and more preferably from 40 to 100 μm. When less than 10 μm, a magnetization per particle is so low that the carrier scatters. When larger than 200 μm, a specific surface area lowers and the toner occasionally scatters, and a solid image of a full-color image occasionally has poor reproducibility.

The resin coating the core material is not particularly limited, and can be selected in accordance with the purpose. Specific examples of the resin include amino resins, polyvinyl resins, polystyrene resins, halogenated olefin resins, polyester resins, polycarbonate resins, polyethylene resins, polyvinyl fluoride resins, polyvinylidene fluoride resins, polytrifluoroethylene resins, polyhexafluoropropylene resins, vinylidenefluoride-acrylate copolymers, vinylidenefluoride-vinylfluoride copolymers, fluoroterpolymers of tetrafluoroethylene, vinylidenefluoride and other monomers including no fluorine atom, and silicone resins. These can be used alone or in combination. Among these, silicone resins are preferably used.

Specific examples of the silicone resin include, but is not limited to, any known silicone resins such as straight silicones formed only of organosiloxane bonds and silicones modified with a resin such as an alkyd resin, a polyester resin, an epoxy resin, an acrylic resin and a urethane resin.

Specific examples of marketed products of the straight silicones include, but are not limited to, KR271, KR255 and KR152 from Shin-Etsu Chemical Co., Ltd; and SR2400, SR2406 and SR2410 from Dow Corning Toray Silicone Co., Ltd. The straight silicone resins can be used alone, and a combination with other constituents crosslinking therewith or charge controlling constituents can also be used. Specific examples of the modified silicones include, but are not limited to, KR206 (alkyd-modified), KR5208 (acrylic-modified), EX1001N (epoxy-modified) and KR305 (urethane-modified) from Shin-Etsu Chemical Co., Ltd; and SR2115 (epoxy-modified) and SR2110 (alkyd-modified) from Dow Corning Toray Silicone Co., Ltd.

The silicone resin can be used alone, and with crosslinkable components and charge controlling agents as well.

The resin layer may include an electroconductive powder when necessary, and specific examples thereof include metallic powders, carbon black, titanium oxide, tin oxide, zinc oxide, etc. The electroconductive powder preferably has an average particle diameter not greater than 1 μm. When greater than 1 μm, it is occasionally difficult to control electrical resistance.

The resin layer can be formed by preparing a coating liquid including a solvent and, e.g., the silicone resin; uniformly coating the liquid on the surface of the core material by a known coating method; and drying the liquid and burning the surface thereof. The coating method includes dip coating methods, spray coating methods, brush coating method, etc.

Specific examples of the solvent include, but are not limited to, toluene, xylene, methyl ethyl ketone, methyl isobutyl ketone, cellosolve butyl acetate, etc. Specific examples of the burning methods include, but are not limited to, externally heating methods or internally heating methods using fixed electric ovens, fluidized electric ovens, rotary electric ovens, burner ovens, microwaves, etc.

The carrier preferably includes the resin layer in an amount of from 0.01 to 5.0% by weight. When less than 0.01% by weight, a uniform resin layer cannot be formed on the core material. When greater than 5.0% by weight, the resin layer becomes so thick that carrier particles granulate one another and uniform carrier particles cannot be formed.

The content of the carrier in a two-component developer is not particularly limited, and can be selected in accordance with the purpose. The developer preferably includes 1 to 10.0 parts by weight per 100 parts by weight of the carrier.

(Image Forming Apparatus)

Figure 3:
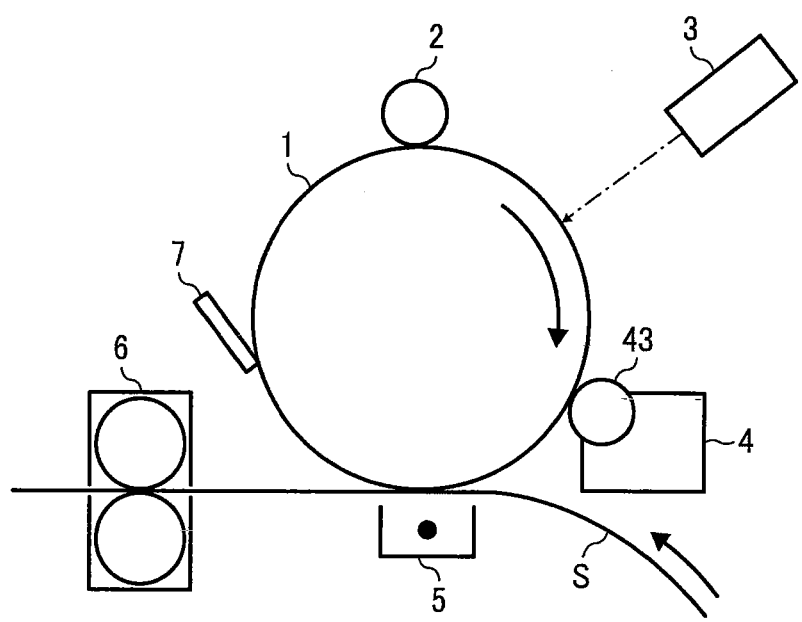
FIG. 3 is a schematic view illustrating a main configuration of an image forming apparatus (copier) used in Examples.

FIG. 3 is a schematic view illustrating a main configuration of an image forming apparatus (copier) used in Examples.

Numeral 1 is an electrostatic latent image bearer (photoreceptor drum), 2 is a charger, 3 is an irradiator, 4 is an image developer, 5 is a transferer, 6 is a fixer, 7 is a cleaner, 43 is a developing sleeve, and S is a sheet (transfer paper, etc.).

Having generally described this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

A molecular weight of a polymer was measured by GPC.
Measurer: GPC-8020 from Tosoh Corp.
Column: TSK G2000HXL and G4000HXL from Tosoh Corp.
Temperature: 40° C.
Solvent: THF (tetrahydrofuran)
Flow Rate: 1.0 ml/min From a molecular weight distribution of a polymer measured by the above-mentioned conditions from 1 mL of a sample having a concentration of 0.5% by weight, a number-average molecular weight (Mn) and a weight-average molecular weight (Mw) of the toner were determined using a molecular weight correction curve prepared by a monodispersion polystyrene standard sample.

<Polymer inversion rate of monomer (mol %)=100−
unreacted monomer (mol %)>

In case of a polyactic acid, in deuteron chloroform, a fourfold line peak area ratio from lactide (4.98 to 5.05 ppm) to that from the polyactic acid (5.10 to 5.20 ppm) was determined using nuclear magnetic resonator JNM-AL300 from JEOL Ltd., and 100 times of the fourfold line peak area ratio was unreacted monomer (mol %).

In case of polycaprolactone, in deuteron chloroform, a triple line peak area ratio from caprolactone (4.22 to 4.25 ppm) to that from the polycaprolactone (4.04 to 4.08 ppm) was determined using nuclear magnetic resonator JNM-AL300 from JEOL Ltd., and 100 times of the triple line peak area ratio was unreacted monomer (mol %).

In case of polycarbonate, in deuteron chloroform, a single line peak area ratio from ethylene carbonate (4.54 ppm) to a four fold line peak area ratio from the polycarbonate (4.22 to 4.25 ppm) was determined using nuclear magnetic resonator JNM-AL300 from JEOL Ltd., and 100 times of the single line peak area ratio was unreacted monomer (mol %).

<Surface Hydrophobicity of Toner>

In a 20-ml vial container, 15 ml of ion-exchanged water were placed, and 0.1 g of a toner was added thereto to observe for 10 min. Then, the toner was left for one day to determine as follows.

Very good: toner completely separates from water, and floats on the water layer
Good: toner mixes with water, and has clear grain boundary
Poor: toner completely mixes with water Synthesis Example 1

Synthesis of Surfactant 2

1,250 parts of 1H, 1H-perfluorooctylacrylate from AZ max. co. and 62.5 parts of 2,2'-azobis(2,4-dimethylvaleronitrile) V-6 from Wako Pure Chemical Industries, Ltd. were filled in a pressure resistant reaction cell (50 volume % of a pressure resistant container cell). Carbone dioxide as a supercritical fluid was fed into the reaction cell by a feed cylinder, and a reaction was performed for 24 hrs at 15 Mpa and 85° C. while controlled by a pressure pump and a heat regulator. Next, the temperature was decreased to 0° C. and the pressure was reduce to normal pressure using a back pressure valve to prepare a surfactant 2 having the following formula. The surfactant 2 had a number-average molecular weight (Mn) of 2,500.

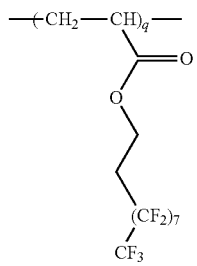

wherein q is an integer representing a repeat unit.

Synthesis Example 2

Synthesis of Surfactant 3

In a 6-ml vial container, 36.1 parts of polyacrylate 5,000 from Wako Pure Chemical Industries, Ltd., 1,480 parts of chloroform from Wako Pure Chemical Industries, Ltd. and 128 parts of 1,1'-carbonylbis-1H-imidazole were placed and stirred for 10 min at room temperature.

Next, 500 parts of polyethylene glycol having a molecular weight of 200 from Wako Pure Chemical Industries, Ltd. were added thereto and stirred for 12 hrs.

Then, chloroform was added thereto, and washed with water.

Next, the mixture was dried with anhydrous sodium sulfate, filtered, and further vacuum-concentrated to prepare a surfactant 3 having the following formula (yield rate 73% by weight). The surfactant 3 had a number-average molecular weight (Mn) of 5,200.

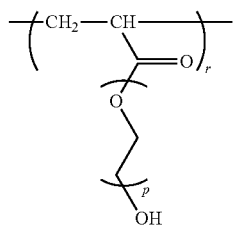

wherein each of r and p is an integer representing a repeat unit.

Synthesis Example 3

Synthesis of Surfactant 4

In a 50-ml flask having the shape of an egg plant, 12 parts of side-chain carboxy-modified silicone oil KF-8012 having a molecular weight 4,500 from Shin-Etsu Chemical Co., Ltd., 33.3 parts of chloroform from Wako Pure Chemical Industries, Ltd., 1,1'-carbonylbis-1H-imidazole and 1.3 parts of polyethylene glycol having a molecular weight of 200 from Wako Pure Chemical Industries, Ltd. were placed and stirred for 12 hrs at room temperature.

Next, saturated sodium hydrogen carbonate aqueous solution was added to the mixture to precipitate sodium stearate, which was filtered with a Kiriyama funnel and washed with saturated sodium hydrogen carbonate aqueous solution.

Then, the mixture was dried with anhydrous sodium sulfate, filtered with a silica gel, and further vacuum-concentrated to prepare a surfactant 4 having the following formula (yield rate 91% by weight). The surfactant 3 had a number-average molecular weight (Mn) of 4,700.

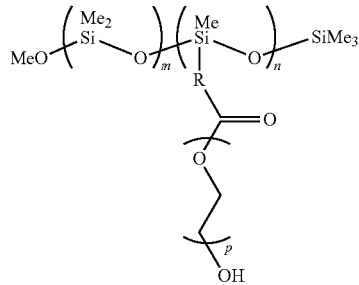

wherein each of m, n and p is an integer representing a repeat unit.

Synthesis Example 4

Synthesis of Surfactant 9

In a 300-ml flask having the shape of an egg plant, 7.9 parts of side-chain amino-modified both-end-methoxy-modified silicone oil KF-857 having a molecular weight 790 from Shin-Etsu Chemical Co., Ltd., 66.6 parts of dichloromethane from Tokyo Chemical Industry Co., Ltd. and 3.6 parts of phenyl isocyanate from Kanto Chemical Co., Ltd. were placed and stirred for 24 hrs at room temperature. Then, hexane was added to the mixture, and which was washed with distilled water. The mixture was dried with anhydrous sodium sulfate, filtered with a cotton wire and silica gel, and a solvent was removed under reduced pressure to prepare a surfactant 9 (yield rate 80% by weight).

Synthesis Example 5

Synthesis of Surfactant 10

The procedure for preparation of the surfactant in Synthesis Example 4 was repeated except for replacing the phenyl isocyanate with 4.0 parts of phenyl isothiocyanate from Wako Pure Chemical Industries, Ltd.
<Preparation of Ring-Opening Polymerizable Monomer Composition 1>

50 parts of C.I. Pigment Yellow PY180, 882.4 parts of L-lactide, 48.9 parts of 4-dimethylamino pyridine, 49.7 parts of the surfactant 1, 50 parts of silicone wax AMS-C30 from Dow Corning Toray Silicone Co., Ltd., and 10,000 parts of YTZ zirconia beads having a diameter of 3 mm were placed in a container, and uniformly dispersed by Paint Shaker from Seiwa Giken Co., Ltd. to prepare a ring-opening polymerizable monomer composition 1.

Example 1

In a pressure resistant container, 1,080 parts of the ring-opening polymerizable monomer composition 1, 882.4 parts of L-lactide, 48.9 parts of 4-dimethylamino pyridine, 49.7 parts of the surfactant 1 and a micro tube including 0.2 parts of dehydrated ethanol were placed. After the mixture was heated to have a temperature of 60° C., supercritical carbon dioxide (60° C. and 30 MPa) was filled in and the reaction was performed for 2 hrs at 60° C.

Next, an exit flow rate was adjusted to 5.0 L/min with a pressure pump and a back pressure valve, and the supercritical carbon dioxide flowed for 30 min. After the organic catalyst and the residual monomer were removed, a normal temperature and a normal pressure were gradually returned in the container, and a colored particulate polymer 1 was formed in the container 3 hrs later.

0.7 parts of hydrophobic silica and 0.3 parts of hydrophobized titanium oxide were added to 100 parts of the colored particulate polymer 1, and mixed by HENSCHEL MIXER at a peripheral speed of 8 m/s for 5 min. A powder after mixed was passed through a mesh having an opening of 100 μm to remove a coarse powder and a toner 1 was prepared. Next, 5% by weight of the toner 1 and 95% by weight of Cu—Zn ferrite carrier coated with a silicone resin, having an average particle diameter of 40 μm were evenly mixed and charged in a TURBULA MIXER rolling a container to stir to prepare a two-component developer 1.

Examples 2 to 24

The procedure for preparation of the two-component developer 1 in Example 1 was repeated to prepare two-component developers 2 to 24 except for changing the catalyst, the surfactant and its quantity, the monomer and the conditions as shown in Tables 1-1 to 1-4.

The surfactants 5 to 10 have the following formulae:

[Surfactant 5]
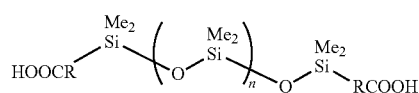

[Surfactant 6]
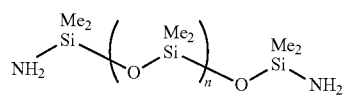

[Surfactant 7]
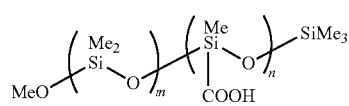

[Surfactant 8]

[Surfactant 9]
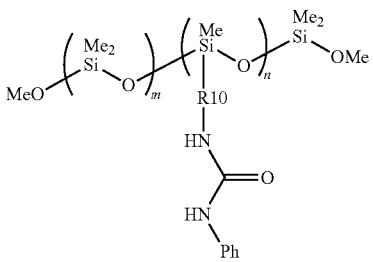

[Surfactant 10]
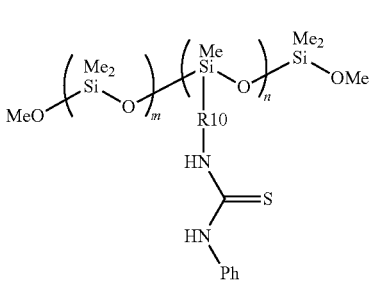

Mn, Mw/Mn, polymer inversion rate and surface hydrophobicity of the toners are shown in Table 1-1 to 1-4.

TABLE 1-1

|  | Example 1 | Example 2 | Example 3 | Example 4 | Example 5 | Example 6 |
|---|---|---|---|---|---|---|
| Toner | Toner 1 | Toner 2 | Toner 3 | Toner 4 | Toner 5 | Toner 6 |
| Catalyst | DMAP | DMAP | DMAP | DMAP | DMAP | DMAP |
| Surfactant | 1 | 1 | 1 | 1 | 1 | 1 |
| Amount of surfactant (parts) | 50 | 50 | 50 | 50 | 50 | 50 |
| Monomer | L-lactide | L-lactide (80 mol %) δ-valero-lactone (20 mol %) | L-lactide (80 mol %) ε-capro-lactone (20 mol %) | L-lactide (80 mol %) Cyclic carbonate X (20 mol %) | L-lactide | L-lactide |
| Pressure (MPa) | 30 | 30 | 30 | 30 | 30 | 30 |
| Temperature (° C.) | 60 | 60 | 60 | 60 | 25 | 35 |
| Mn | 12,000 | 18,000 | 20,000 | 18,000 | 8,500 | 7,700 |
| Mw/Mn | 1.3 | 1.1 | 1.4 | 1.3 | 1.4 | 1.2 |
| Monomer inversion rate (mol %) | 96 | 97 | 98 | 96 | 76 | 81 |
| Surface hydrophobicity | Very good | Very good | Very good | Very good | Very good | Very good |

TABLE 1-2

|  | Example 7 | Example 8 | Example 9 | Example 10 | Example 11 | Example 12 |
|---|---|---|---|---|---|---|
| Toner | Toner 7 | Toner 8 | Toner 9 | Toner 10 | Toner 11 | Toner 12 |
| Catalyst | DMAP | DMAP | DMAP | DMAP | DMAP | DMAP |
| Surfactant | 1 | 1 | 1 | 1 | 1 | 1 |
| Amount of surfactant (parts) | 50 | 50 | 50 | 50 | 50 | 50 |
| Monomer | L-lactide | L-lactide | L-lactide | L-lactide | L-lactide | L-lactide |
| Pressure (MPa) | 30 | 30 | 24 | 36 | 40 | 48 |

TABLE 1-2-continued

|  | Example 7 | Example 8 | Example 9 | Example 10 | Example 11 | Example 12 |
|---|---|---|---|---|---|---|
| Temperature (° C.) | 80 | 100 | 80 | 60 | 60 | 60 |
| Mn | 11,000 | 14,000 | 7,700 | 10,000 | 11,000 | 13,000 |
| Mw/Mn | 1.4 | 1.3 | 1.5 | 1.5 | 1.4 | 1.4 |
| Monomer inversion rate (mol %) | 92 | 90 | 68 | 86 | 95 | 95 |
| Surface hydrophobicity | Very good | Very good | Very good | Very good | Very good | Very good |

TABLE 1-3

|  | Example 13 | Example 14 | Example 15 | Example 16 | Example 17 | Example 18 |
|---|---|---|---|---|---|---|
| Toner | Toner 13 | Toner 14 | Toner 15 | Toner 16 | Toner 17 | Toner 18 |
| Catalyst | DABCO | DBU | PPY | DMAP | DMAP | DMAP |
| Surfactant | 1 | 1 | 1 | 2 | 3 | 4 |
| Amount of surfactant (parts) | 50 | 50 | 50 | 72 | 83 | 85 |
| Monomer | L-lactide | L-lactide | L-lactide | L-lactide | L-lactide | L-lactide |
| Pressure (MPa) | 30 | 30 | 30 | 30 | 30 | 30 |
| Temperature (° C.) | 60 | 60 | 60 | 60 | 60 | 60 |
| Mn | 12,000 | 14,000 | 13,000 | 20,000 | 19,000 | 12,000 |
| Mw/Mn | 1.5 | 1.4 | 1.4 | 1.2 | 1.3 | 1.4 |
| Monomer inversion rate (mol %) | 94 | 94 | 91 | 88 | 90 | 95 |
| Surface hydrophobicity | Very good | Very good | Very good | Very good | Very good | Very good |

TABLE 1-4

|  | Example 19 | Example 20 | Example 21 | Example 22 | Example 23 | Example 24 |
|---|---|---|---|---|---|---|
| Toner | Toner 7 | Toner 8 | Toner 9 | Toner 10 | Toner 11 | Toner 12 |
| Catalyst | DMAP | DMAP | DMAP | DMAP | DMAP | DMAP |
| Surfactant | 5 | 6 | 7 | 8 | 9 | 10 |
| Amount of surfactant (parts) | 84 | 86 | 86 | 85 | 85 | 83 |
| Monomer | L-lactide | L-lactide | L-lactide | L-lactide | L-lactide | L-lactide |
| Pressure (MPa) | 30 | 30 | 30 | 30 | 30 | 30 |
| Temperature (° C.) | 60 | 60 | 60 | 60 | 60 | 60 |
| Mn | 15,000 | 16,000 | 14,000 | 15,000 | 12,000 | 14,000 |
| Mw/Mn | 1.2 | 1.2 | 1.3 | 1.4 | 1.3 | 1.3 |
| Monomer inversion rate (mol %) | 94 | 87 | 86 | 88 | 90 | 91 |
| Surface hydrophobicity | Very good | Very good | Very good | Very good | Very good | Very good |

—Preparation of Resin (b)—

In an autoclave reaction vessel including a thermometer, a stirrer and a nitrogen inlet tube, materials shown in polyester diol b11 in Table 2 and 2 parts of tin 2-ethylhexylate were subjected to ring-opening polymerization at normal pressure and 160° C. for 3 hrs, and further reacted at normal pressure and 130° C. The resultant resin was cooled to have room temperature and pulverized to prepare polyester diols (b11)-1 and (b11)-2 having a polyhydroxy carboxylic acid skeleton. Polyester diols (b12)-1 and (b12)-2 formed by dehydrating and condensing materials shown in polyester diol b11 in Table 2 and the polyester diols (b11)-1 and (b11)-2 were dissolved in methyl ethyl ketone, an IPDI was added thereto as an elongator, subjected to elongation reaction at 50° C. for 6 hrs, and a solvent was removed therefrom to prepare [resin b-1] and [resin b-2].

TABLE 2

| | Polyester b | | | | | |
|---|---|---|---|---|---|---|
| | Polyester diol b11 | | | | Polyester diol b12 | |
| | 1,3-propane diol (Parts) | 1,4-butane diol (Parts) | L-lactide (Parts) | D-lactide (Parts) | EO 2 mol adduct bisphenol A (Parts) | Terephthalic acid (Parts) |
| Resin b-1 | 2 | 0 | 54 | 14 | 15 | 15 |
| Resin b-2 | 0 | 2 | 50 | 13 | 17.5 | 17.5 |

L-lactide, D-lactide, ε-caprolactone and tin octylate were placed in parts shown in Table 3 in a four-opening flask, and heated and melted at 120° C. for 20 min in a nitrogen atmosphere. Next, tin octylate was added thereto in parts shown in Table 3 and heated and melted at 190° C. for 3 hrs. Then, the residual lactide and caprolactone were removed under reduced pressure to prepare [resin b-3] and [resin b-4].

TABLE 3

| | L-lactide (parts) | D-lactide (parts) | ε-caprolactone (parts) | tin octylate (parts) |
|---|---|---|---|---|
| Resin b-3 | 80 | 20 | 10 | 1 |
| Resin b-4 | 70 | 30 | 5 | 1 |

—Synthesis of Polyester Prepolymer—

720 parts of an adduct of bisphenol A with 2 moles of ethyleneoxide, 90 parts of an adduct of bisphenol A with 2 moles of propyleneoxide, 290 parts terephthalic acid, 25 parts of trimellitic acid anhydride and 2 parts of dibutyltinoxide were mixed and reacted in a reactor vessel including a cooling pipe, a stirrer and a nitrogen inlet pipe for 8 hrs at a normal pressure and 230° C. Further, after the mixture was depressurized by 10 to 15 mm Hg and reacted for 5 hrs to prepare an intermediate polyester resin.

The intermediate polyester resin had a number-average molecular weight of 2,500, a weight-average molecular weight of 10,700, a peak molecular weight of 3,400, a glass transition temperature of 57° C. and an acid value of 0.4 mg KOH/g and a hydroxyl value of 49 mg KOH/g.

Next, 400 parts of the intermediate polyester resin, 95 parts of isophoronediisocyanate and 580 parts of ethyl acetate were reacted in a reactor vessel including a cooling pipe, a stirrer and a nitrogen inlet pipe for 8 hrs at 100° C. to prepare a polyester prepolymer. The polyester prepolymer included a free isocyanate in an amount of 1.42% by weight.

—Preparation of Graft Polymer—

In a rector vessel including a stirrer and a thermometer, 480 parts of xylene, 100 parts of a low-molecular-weight polyethylene (SANWAX LEL-400 from Sanyo Chemical Industries, Ltd., having a softening point of 128° C.) were dissolved and subjected to nitrogen substitution. Then, a mixed solution including 755 parts of styrene, 100 parts of acrylonitrile, 45 parts of butylacrylate, 21 parts of acrylic acid, 37 parts of di-t-butylperoxyhexahydroterephthalate and 100 parts of xylene was dropped therein for 3 hrs 170° C. to polymerize, and further left for 0.5 hrs at this temperature. Next, the mixture was de-solvented to prepare a graft polymer. The graft polymer had a number-average molecular weight of 3,300, a weight-average molecular weight of 18,000, a glass transition temperature of 65.0° C. and a vinyl resin SP value of 11.0 $(cal/cm^3)^{1/2}$.

—Synthesis of Ketimine Compound—

30 parts of isophoronediamine and 70 parts of methyl ethyl ketone were reacted at 50° C. for 5 hrs in a reaction vessel including a stirrer and a thermometer to prepare a ketimine compound.

The ketimine compound had an amine value of 423 mg KOH/g.

—Preparation of Masterbatch—

1,000 parts of water, 530 parts of carbon black Printex 35 from Degussa A.G. having a DBP oil absorption of 42 ml/100 mg and a pH of 9.5, 1,200 parts of the [resin b-1] were mixed by HENSCHEL MIXER from Mitsui Mining Co., Ltd. After the mixture was kneaded by a two-roll mill having a surface temperature of 150° C. for 30 min, the mixture was extended by applying pressure, cooled and pulverized by a pulverizer from Hosokawa Micron Limited to prepare a [Masterbatch 1].

The procedure for preparation of Masterbatch 1 was repeated to prepare Masterbatches 2 to 4 except for replacing the [resin b-1] with the [resin b-2] to [resin b-4], respectively.

—Preparation of Resin (a)—

A mixture including 1,578 g of terephthalic acid, 83 g of isophthalic acid, 374 g of ethyleneglycol, and 730 g of neopentylglycol was heated at 260° C. for 2.5 hrs in an autoclave to perform an esterification reaction. Next, 0.262 g of germanium dioxide as a catalyst was added thereto, the mixture was heated to have a temperature of 280° C. in 30 min, and gradually depressurized to have a pressure of 1 Torr in 1 hr. The polycondensation was further continued under this condition, and the mixture was depressurized to have normal pressure in 1.5 hrs and cooled to have a temperature of 260° C. Then, 50 g of isophthalic acid and 38 g of trimellitic acid anhydride were added thereto, and the mixture was stirred at 255° C. for 30 min to form a sheet-shaped material. This was cooled to have room temperature, pulverized by a crusher, and sieved with a sieve having an opening of 1 to 6 mm to prepare a polyester resin (a-1). Analysis results of the polyester resin (a-1) are shown in Tables 4-1 and 4-2.

—Preparation of Polyester Resin (a-2) and Polyester Resin (a-3)—

Polyester resin (a-2) and polyester resin (a-3) were prepared by methods similar to that of the polyester resin (a-1).

Analysis results of the polyester resins (a-1) to (a-3) are shown in Table 4-1 and 4-2.

TABLE 4-1

| | Acid | | | | | Alcohol | |
|---|---|---|---|---|---|---|---|
| | Terephthalic acid (mol) | Isophthalic acid (mol) | Trimellitic acid (mol) | Phthalic acid (mol) | Adipic acid (mol) | Ethylene glycol (mol) | Neopentyl glycol (mol) |
| Resin a-1 | 95.1 | 8 | 2 | 0 | 0 | 44.3 | 55.7 |
| Resin a-2 | 67.8 | 32.9 | 2.1 | 0 | 0 | 39.8 | 60.2 |
| Resin a-3 | 70.1 | 15.9 | 0 | 1.5 | 14.8 | 44.4 | 55.7 |

TABLE 4-2

| | Properties | | | |
|---|---|---|---|---|
| | Acid value (mgKOH) | Mw | Relative viscosity | Glass transition temperature (° C.) |
| Resin a-1 | 30.3 | 9,800 | 1.28 | 68 |
| Resin a-2 | 22.3 | 13,500 | 1.33 | 63 |
| Resin a-3 | 10.9 | 19,000 | 1.34 | 50 |

—Preparation of Particulate Material Dispersion (w)—

In a 2 L glass container with a jacket, 200 g of the polyester resin (a-1), 35 g of ethyleneglycol-n-butyl ether, 459 g of polyvinylalcohol aqueous solution (PVA-1) having a concentration of 0.5% by weight (Unitika poval 050G from Unitika Ltd.), and N,N-dimethyl methanol amine (DMEA) in an amount 1.2 times of total carboxyl groups included in the polyester resin were placed. The mixture was stirred by an open type desktop Homodisper (TK robomix from PRIMIX Corp.) at 6,000 rpm, a particulate resin did not precipitate on the bottom of the container and completely floated. Then, hot water was passed through the jacket to heat. When the container has an inner temperature of 68° C., the mixture was stirred at 7,000 rpm and further stirred for 20 min at 68 to 70° C. to prepare a lacteous uniform aqueous dispersion. Cold water was passed through the jacket to cool the dispersion to have room temperature while stirred at 3,500 rpm. Then, the dispersion was filtered with a flat-woven stainless filter (635 mesh) and almost no particulate resin remained on the filter. Analysis results of the filtered particulate material dispersion (w-1) are shown in Table 5.

—Preparation of Particulate Material Dispersions (w-2) and (w-3)—

Particulate material dispersions (w-2) and (w-3) were prepared by methods similar to that of the particulate material dispersion (w-1).

Analysis results of the particulate material dispersions (w-2) and (w-3) are shown in Table 5.

—Preparation of Particulate Material Dispersion (w-4)—

In a reactor vessel including a stirrer and a thermometer, 600 parts of water, 120 parts of styrene, 100 parts of methacrylate, 45 parts of butylacrylate and 10 parts of a sodium salt of alkyl allyl sulfosuccinate (ELEMINOL JS-2 from Sanyo Chemical Industries, Ltd.) and 1 part of persulfate ammonium were mixed, and the mixture was stirred for 20 min at 400 rpm to prepare a white emulsion. The white emulsion was heated to have a temperature of 75° C. and reacted for 6 hrs. Further, 30 parts of an aqueous solution of persulfate ammonium having a concentration of 1% were added thereto and the mixture was reacted at 75° C. for 5 hrs to prepare an aqueous dispersion [a particulate material dispersion (w-4)] of a vinyl resin (a copolymer of a sodium salt of styrene-methacrylate-butylacrylate-alkyl allyl sulfosuccinate). The particulate material dispersion (w-4) had a volume-average particle diameter of 0.08 μm when measured by ELS-800. The particulate material dispersion (w-4) was partially dried to separate the resin therefrom, and the resin had a glass transition temperature of 74° C. when measure by the flow tester.

—Preparation of Aqueous Medium—

300 parts of ion-exchanged water, 300 parts of the particulate material dispersion (w-1) and 0.2 parts of sodium dodecylbenzenesulfonate were uniformly dissolved to prepare an [aqueous medium phase 1].

—Preparation of Resin Solution—

In a reactor vessel, the polyester resins (b-1) to (b-4) in an amount shown in Table 6, the polyester prepolymer in an amount shown therein and 80 parts of ethylacetate were stirred to prepare resin solutions 1 to 4.

TABLE 6

| | Resin b | | Polyester prepolymer |
|---|---|---|---|
| | Resin | parts | (parts) |
| Resin solution 1 | Resin b-1 | 85 | 15 |
| Resin solution 2 | Resin b-2 | 80 | 20 |

TABLE 5

| | Resin a | Dimethyl ethanol amine (eq./—COOH) | Triethylamine (eq./—COOH) | Ethyleneglycol mono-n-butyl ether (g) | PVA-1 (g) |
|---|---|---|---|---|---|
| Particulate material dispersion w-1 | Resin a-1 | 1.2 | 0 | 35 | 459 |
| Particulate material dispersion w-2 | Resin a-2 | 0 | 1.2 | 37 | 460 |
| Particulate material dispersion w-3 | Resin a-3 | 1.3 | 0 | 45 | 470 |

TABLE 6-continued

| | Resin b | | Polyester prepolymer |
|---|---|---|---|
| | Resin | parts | (parts) |
| Resin solution 3 | Resin b-3 | 100 | 0 |
| Resin solution 4 | Resin b-4 | 100 | 0 |

—Preparation of Emulsion—

In each of the resin solutions 1 to 4, 5 parts of carnauba wax having a molecular weight of 1,800, an acid value of 2.7 mg KOH/g and a penetration of 1.7 mm at 40° C., 0.75 parts of the graft polymer and 5 parts of the masterbatch 1 were dispersed by a beads mill (Ultra Visco Mill from Aimex Co., Ltd.) for 3 passes at a liquid feeding speed of 1 kg/hr and a peripheral disc speed of 6 m/sec, filling zirconia beads having diameter of 0.5 mm for 80% by volume. Further, 2.5 parts if the ketimine compound were dissolved therein to prepare a toner material liquid.

Next, 150 parts of the aqueous medium phase 1 were placed in a vessel, and 100 parts of the toner material liquid was added thereto while mixed by TK-type homomixer from Tokushu Kika Kogyo Co., Ltd. at 12,000 rpm for 10 min to prepare an emulsified slurry. Further, 100 parts of the emulsified slurry was placed in a reaction container including a stirring bar and a thermometer, and de-solvented at 30° C. for 10 hrs while stirred at a peripheral speed 30 m/min to prepare a dispersion slurry.

Next, 100 parts of the dispersion slurry was filtered under reduced pressure to prepare a filtered cake, and 100 parts of ion-exchanged water were added to the filtered cake and mixed by TK-type homomixer at 12,000 rpm for 10 min, and the mixture was filtered. 300 parts of ion-exchanged water were further added to the filtered cake and mixed by TK-type homomixer at 12,000 rpm for 10 min, and the mixture was filtered, which was repeated again. Further, 20 parts of an aqueous solution of sodium hydrate having a concentration of 10% by weight were added to the filtered cake and mixed by TK-type homomixer at 12,000 rpm for 30 min, and the mixture was filtered under reduced pressure. 300 parts of ion-exchanged water were further added to the filtered cake and mixed by TK-type homomixer at 12,000 rpm for 10 min, and the mixture was filtered. 300 parts of ion-exchanged water were further added to the filtered cake and mixed by TK-type homomixer at 12,000 rpm for 10 min, and the mixture was filtered, which was repeated again. 20 parts of hydrochloric acid having a concentration of 10% by weight were added to the filtered cake and mixed by TK-type homomixer at 12,000 rpm for 30 min. A methanol solution having a concentration of 5% by weight including a fluorinated quaternary ammonium salt compound FUTAR-GENT F-310 from Neos Co., Ltd. was added thereto such that the fluorinated quaternary ammonium salt is 0.1 parts by weight per 100 parts by weight of solid contents of the toner, stirred for 10 min and filtered. 300 parts of ion-exchanged water were further added to the filtered cake and mixed by TK-type homomixer at 12,000 rpm for 10 min, and the mixture was filtered, which was repeated again. The filtered cake was dried by an air drier at 40° C. for 36 hrs and sieved by a mesh having an opening of 75 μm to prepare mother toner particles 25.

Mother toner particles 26 to 28 were similarly prepared.

TABLE 7

| | Resin solution | Resin b Resin | Resin b parts | Polyester prepolymer | Ketimine (parts) | Graft Polymer (parts) | Particulate material dispersion |
|---|---|---|---|---|---|---|---|
| Mother toner particles 25 | Resin solution 1 | Resin b-1 | 85 | 15 | 2.5 | 0.75 | w-1 |
| Mother toner particles 25 | Resin solution 2 | Resin b-2 | 85 | 15 | 2.5 | 0.75 | w-2 |
| Mother toner particles 25 | Resin solution 3 | Resin b-3 | 85 | 15 | 2.5 | 0.75 | w-3 |
| Mother toner particles 25 | Resin solution 4 | Resin b-4 | 80 | 20 | 2.5 | 0.75 | w-4 |

Comparative Examples 1 to 4

Preparation of Toner 100 parts of each of the mother toner particles 25 to 28 and 1.0 part of hydrophobic silica (H2000 from Clariant (Japan) K.K. were mixed by HENSCHEL MIXER from Mitsui Mining Co., Ltd. at a peripheral speed of 30 m/sec for 30 sec, and paused for 1 min, which was repeated for 5 times. Then, the particles were sieved by a mesh having an opening of 35 μm to prepare to prepare toners 25 to 28 of Comparative Examples 1 to 4.

Properties of the toners are shown in Table 8.

TABLE 8

| | Comparative Example 1 | Comparative Example 2 | Comparative Example 3 | Comparative Example 4 |
|---|---|---|---|---|
| Toner | Toner 25 | Toner 26 | Toner 27 | Toner 28 |
| Mn | 15,000 | 13,000 | 16,000 | 15,000 |
| Mw/Mn | 1.9 | 2.3 | 2.1 | 2 |
| Monomer inversion rate (mol %) | 77 | 80 | 85 | 74 |
| Surface hydrophobicity | Poor | Poor | Poor | Poor |

—Preparation of Developer—

The procedure for preparation of the developer in Example 1 was repeated except for replacing the toner 1 with the toners 25 to 28.

Fixability, heat and humidity resistant preservability and environmental stability of the developers are evaluated.

The results are shown in Table 9.

<Fixability>

A solid image was produced by electrophotographic copier MF-200 using TEFLON fixing roller on an ordinary transfer paper and a thick transfer paper, i.e., TYPE 6200 from Ricoh Company, Ltd. and Copy Paper <135> from NBS RICOH Co., Ltd. such that a toner adhered thereto in an amount of 0.85±0.1 mg/cm². A temperature of the fixing belt was changed to perform a fixing test and a maximum temperature at which the hot offset did not occur on the ordinary transfer paper was determined as a maximum fixable temperature. A temperature at which the image density of an image produced on the thick paper had a residual ratio not less than 70% was determined as a minimum fixable temperature. The following A to C are acceptable criteria.

[Maximum Fixable Temperature]
  A: Not less than 190° C.
  B: Not less than 180° C. and less than 190° C.
  C: Not less than 170° C. and less than 180° C.
  D: less than 170° C.

[Minimum Fixable Temperature]
  A: Less than 135° C.
  B: Not less than 135° C. and less than 145° C.
  C: Not less than 145° C. and less than 155° C.
  D: Not less than 155° C.

<Heat and Humidity Resistant Preservability>

Four (4) grams of the toner were placed in a closing cylindrical container having a diameter of 5 cm and a height of 2 cm, and left for 72 hrs in an environment of 45° C. and 65% R/H. Then, the container was lightly shaken and toner agglutination was visually observed. The following A to C are acceptable criteria.
  A: No toner agglutination was observed
  B: 1 to 2 agglutinated toners were observed
  C: 3 to 5 agglutinated toners were observed
  D: 6 or more agglutinated toners were observed <Environmental Stability>

After the developer was stirred by a ball mill for 5 min in an environment of 23° C. and 50% R/H. (M/M environment), a charge quantity of 1.0 g of the developer was measured by a blow-off charge quantity measurer TB-200 from Toshiba Chemical Corp. after subjected to nitrogen blow for 1 min. The charge quantity in each of an environment of 40° C. and 90% R/H. (H/H environment) and an environment of 10° C. and 30% R/H. (L/L environment) was also measured to determine an environmental variation by the following formula. The less the variation, the more stable chargeability the developer has. The following A to C are acceptable criteria.

$$\text{Environmental variation} = 2\times(L/L - H/H)/(L/L + H/H)\times 100(\%)$$

A: less than 10%
  B: Not less than 10% and less than 30%
  C: Not less than 30% and less than 50%
  D: Not less than 50%

TABLE 9

| | Toner | Maximum fixable temperature | Minimum fixable temperature | Heat and humidity resistant preservability | Environmental stability |
|---|---|---|---|---|---|
| Example 1 | Toner 1 | A | A | A | A |
| Example 2 | Toner 2 | A | A | A | A |
| Example 3 | Toner 3 | B | A | A | B |
| Example 4 | Toner 4 | A | A | A | A |
| Example 5 | Toner 5 | A | A | B | B |
| Example 6 | Toner 6 | A | A | A | A |
| Example 7 | Toner 7 | A | A | B | B |
| Example 8 | Toner 8 | A | A | A | A |
| Example 9 | Toner 9 | A | | A | A |
| Example 10 | Toner 10 | A | A | A | A |
| Example 11 | Toner 11 | A | A | A | A |
| Example 12 | Toner 12 | A | A | B | A |
| Example 13 | Toner 13 | A | A | B | B |
| Example 14 | Toner 14 | A | A | A | A |
| Example 15 | Toner 15 | A | A | A | A |
| Example 16 | Toner 16 | A | A | B | B |
| Example 17 | Toner 17 | A | B | A | A |
| Example 18 | Toner 18 | A | B | A | A |
| Example 19 | Toner 19 | A | A | A | A |
| Example 20 | Toner 20 | A | A | A | A |
| Example 21 | Toner 21 | A | A | B | A |
| Example 22 | Toner 22 | A | A | A | A |
| Example 23 | Toner 23 | A | A | A | A |
| Example 24 | Toner 24 | A | A | B | A |
| Comparative Example 1 | Toner 25 | D | A | A | B |
| Comparative Example 2 | Toner 26 | B | B | D | D |
| Comparative Example 3 | Toner 27 | C | D | B | D |
| Comparative Example 4 | Toner 28 | C | D | B | C |

The toner of the present invention has less environmental variation in charge quantity because of being formed of a hydrophobic resin, and good fixability and heat and humidity resistance because the resin has a narrow molecular weight distribution.

What is claimed is:

1. A method of preparing toner, comprising:
   granulating while polymerizing a ring-opening polymerizable monomer with a catalyst for ring-opening polymerization under the presence of a surfactant and a colorant in a compressible fluid, wherein a particulate polymer seed is added to the compressible fluid onto which the ring-opening polymerizable monomer undergoes polymerization, wherein the ring-opening polymerizable monomer is at least one member selected from the group consisting of cyclic esters and cyclic carbonates, and wherein the compressible fluid comprises carbon dioxide.

2. The method of claim 1, wherein the catalyst is an organic catalyst which is a nucleophilic nitrogen compound having basicity.

3. The method of claim 2, wherein the organic catalyst is a cyclic compound having a nitrogen atom.

4. The method of claim 2, wherein the organic catalyst is a member selected from the group consisting of cyclic amines, cyclic diamines, cyclic diamine compounds having amidine skeleton, cyclic triamine compounds having a guanidine skeleton, heterocyclic aromatic organic compounds including a nitrogen atom and N-heterocyclic carbene.

5. The method of claim 4, the organic catalyst is a member selected from the group consisting of 1,4-diazabicyclo-[2.2.2]octane (DABCO), 1,8-diazabicyclo[5.4.0]undeca-7-ene(DBU)), 1,5,7-triazabicyclo[4.4.0]deca-5-ene (TBD), diphenylguanidine (DPG), N,N-dimethyl-4-aminopyridine (DMAP), 4-pyrolidinopyridine (PPY) and 1,3-di-tert-butyl-imidazole-2-ylidene (ITBU).

6. The method of claim 1, wherein the colorant is a pigment.

7. The method of claim 1, wherein the ring-opening polymerizable monomer is L- or D-lactide.

8. The method of claim 1, wherein the surfactant has affinity with the compressible fluid and the ring-opening polymerizable monomer.

9. The method of claim 1, wherein the surfactant has a perfluoroalkyl group, polydimethylsiloxane group or a polyacrylate group.

10. The method of claim 1, wherein the toner has a ratio (Mw/Mn) of a weight-average molecular weight (Mw) to a number-average molecular weight (Mn) not greater than 1.5.

* * * * *